United States Patent
Knaust

(10) Patent No.: US 11,548,135 B1
(45) Date of Patent: Jan. 10, 2023

(54) KITCHEN INSTRUMENT WITH REPLACEABLE HEAD

(71) Applicant: Juston D. Knaust, Queen Creek, AZ (US)

(72) Inventor: Juston D. Knaust, Queen Creek, AZ (US)

(*) Notice: Subject to any disclaimer, the term of this patent is extended or adjusted under 35 U.S.C. 154(b) by 0 days.

(21) Appl. No.: 17/873,230

(22) Filed: Jul. 26, 2022

Related U.S. Application Data

(60) Provisional application No. 63/226,163, filed on Jul. 27, 2021.

(51) Int. Cl.
| | | |
|---|---|---|
| B25G 3/12 | (2006.01) | |
| A47J 43/28 | (2006.01) | |
| B25F 1/02 | (2006.01) | |
| B25G 1/10 | (2006.01) | |

(52) U.S. Cl.
CPC ............ B25G 3/12 (2013.01); A47J 43/288 (2013.01); B25F 1/02 (2013.01); B25G 1/102 (2013.01)

(58) Field of Classification Search
CPC ........... B25G 3/12; B25G 1/102; A47J 43/288
USPC .......................................................... 81/489
See application file for complete search history.

(56) References Cited

U.S. PATENT DOCUMENTS

| | | | | |
|---|---|---|---|---|
| 2,470,399 | A * | 5/1949 | Holben | B25B 23/0057 81/124.1 |
| 2,924,481 | A * | 2/1960 | Wagstaff | H01K 3/32 81/53.11 |
| 6,250,493 | B1 | 6/2001 | Kwan | |
| 6,412,398 | B1 | 7/2002 | Norcross et al. | |
| 7,159,265 | B2 * | 1/2007 | Soller | A47K 11/10 15/177 |
| 8,220,852 | B2 | 7/2012 | Fenstemaker | |
| 2006/0175228 | A1 | 8/2006 | Howel et al. | |
| 2010/0186559 | A1 | 7/2010 | Pell | |
| 2010/0263219 | A1 * | 10/2010 | Kempker | B26B 25/005 83/13 |

(Continued)

FOREIGN PATENT DOCUMENTS

| | | |
|---|---|---|
| EP | 3040003 A1 | 7/2016 |
| KR | 101228619 B1 | 1/2013 |

OTHER PUBLICATIONS

"Click 'N Cook Modular Spatula by Quirky," frontgate.com. https://www.frontgate.com/click-n-cook-modular-spatula-by-quirky/389603 [Date accessed: Apr. 21, 2021].

*Primary Examiner* — Hadi Shakeri
(74) *Attorney, Agent, or Firm* — Bold IP, PLLC; Houda El-Jarrah

(57) ABSTRACT

A kitchen instrument with a replaceable head is described having a handle, an ejection shaft, and an ejection knob. The handle is mostly hollow with an opening on a first side and an opening on the second side opposite the first side. The opening on the first side includes an indent shaped to secure a replaceable head by preventing exiting from the indent and also from rotating. The replaceable head has a connector with a first connecting portion and a second connecting portion shaped to be secured in the indent. An ejection shaft is sized and arranged to be inserted in the second side and pass through the handle. The ejection shaft is sized to press on the replaceable head to eject the replaceable head. Multiple replaceable kitchen utensils in the form of replaceable heads are attachable to the same handle of the kitchen instrument.

20 Claims, 14 Drawing Sheets

(56) References Cited

U.S. PATENT DOCUMENTS

2012/0037639 A1   2/2012   Gotsis et al.

* cited by examiner

US 11,548,135 B1

KITCHEN INSTRUMENT WITH REPLACEABLE HEAD

CROSS-REFERENCE TO RELATED APPLICATIONS

This application is a non-provisional application which claims priority to U.S. Provisional Patent Application No. 63/226,163 filed on Jul. 27, 2021, which is incorporated by reference in its entirety.

FIELD OF THE INVENTION

One or more non-limiting embodiments are presented for a kitchen utensil with a replaceable head, such that a variety of replaceable heads may be substituted using a same handle and ejection shaft, which may be useful to minimize clutter in the kitchen and reduce a number of utensils a user has to purchase.

BACKGROUND

Various attempts have been made to create kitchen utensils with replaceable heads. So far, none have had widespread success. A few key reasons for the limited success of these kitchen utensils are difficulty in replacing heads which are very insecure and rattling fittings of the replaceable heads to the handles. Attempts to make the replaceable head secure often make it difficult to replace the heads and attempts to make replacing the head easy often make the head have a loose or rattling fit to the handle.

Accordingly, there is still a need to create an improved kitchen instrument having a myriad of replaceable heads that can substitute for a number of kitchen utensils and minimize clutter in a kitchen.

SUMMARY

The present description relates to a novel and unique kitchen instrument that uses a handle that can hold an ejection shaft and ejection knob in order to switch out multiple replaceable kitchen heads. In a non-limiting embodiment, the present description relates to a kitchen instrument comprising an ejection knob, an ejection shaft, a handle having a hollow cavity extended through the handle, and a first replaceable kitchen utensil head having a connector that can connect to the front side of the handle and be ejected when needed to replace with another replaceable kitchen utensil head.

In a non-limiting embodiment, the ejection knob comprises an ejection knob central opening and a protruding piece protruding from within the ejection knob central opening. In a non-limiting embodiment, the ejection shaft comprises a shaft body that is an elongated member, a front end of the shaft body, and a back end of the shaft body, whereby the back end of the shaft body comprises a back end shaft opening, wherein the protruding piece contained within the ejection knob central opening is configured to couple to the back end shaft opening.

In a non-limiting embodiment, the handle of the kitchen instrument comprises a handle body having a first opening on a front side of the handle, wherein the first opening includes an indent having a first securing portion that curves or otherwise leads inwardly towards a second securing portion, whereby the second securing portion has one or more recessed sidewalls that lead into a hollow cavity of the handle, whereby the hollow cavity of the handle extends through the handle body from the second securing portion near the front side of the handle to a back side of the handle. In a non-limiting embodiment, the ejection shaft is sized and shaped to be inserted within the hollow cavity of the handle and to protrude out through a back side of the handle.

In a non-limiting embodiment, the kitchen instrument is configured to hold a number of replaceable kitchen utensil heads. A replaceable kitchen utensil head may comprise a connector to the replaceable head utensil piece, wherein the connector has a terminal end shaped and configured to interact with the indent to cause the connector to be secured within the first securing portion and the second securing portion of the indent and to prevent rotation within the indent.

When the ejection knob is connected to the ejection shaft and the ejection shaft is contained within the interior hollow cavity of the handle, and the replaceable kitchen utensil head is connected via the connector to a front end of the handle via the indent, a user may depress or push down on the back of the ejection knob to cause the ejection shaft to push onto the connector to eject the replaceable kitchen utensil head from the handle of the kitchen instrument. In this manner, the replaceable kitchen utensil head can be removed to exchange the replaceable kitchen utensil head with another replaceable kitchen utensil head, and/or for washing and cleaning purposes.

Other aspects and advantages of the invention will be apparent from the following description and the appended claims.

DETAILED DESCRIPTION

The present description relates to a kitchen instrument that has a handle and ejection rod for ejecting a first kitchen instrument head and replacing with a second kind of kitchen instrument head. For example, a first kitchen instrument head may have a shape and form of a spatula head while the second kitchen instrument head may have the shape and form of another type of kitchen utensil, including, but not limited to a spoon head, a ladle head, a fork head, a knife head, a masher head, a grating head, etc. Accordingly, the user may purchase a single handle, ejection shaft, and ejection knob, and a variety of replaceable, interchangeable kitchen utensil heads to switch out onto the single handle, ejection shaft, and ejection knob to minimize clutter and cleaning.

The disclosed device is unique when compared with other known devices and solutions because it provides a secure fitting replaceable head which is very easy to replace. Accordingly, a user can easily and quickly change multiple kitchen heads using one handle that acts as a holder of the ejection shaft. The various kitchen heads can be attached to a front of the handle and used to mix, stir, scrape, pick up, turn over, grab, poke, or perform any action that is provided by a myriad, variety of kitchen instruments and that can be condensed and combined into a single kitchen instrument as described herein with multiple interchangeable kitchen heads.

In one or more non-limiting embodiment, the disclosed device is unique in that it is structurally different from other known devices or solutions. More specifically, the disclosed kitchen instrument device is unique due to the presence of an ejection shaft that passes through a second side to eject a replaceable head from an indent in the first side. Additionally, in one or more non-limiting embodiments, the indent has two portions, a first portion for securing the replaceable head from rotating and a second portion for securing the replaceable head from leaving the indent.

Figure 1:
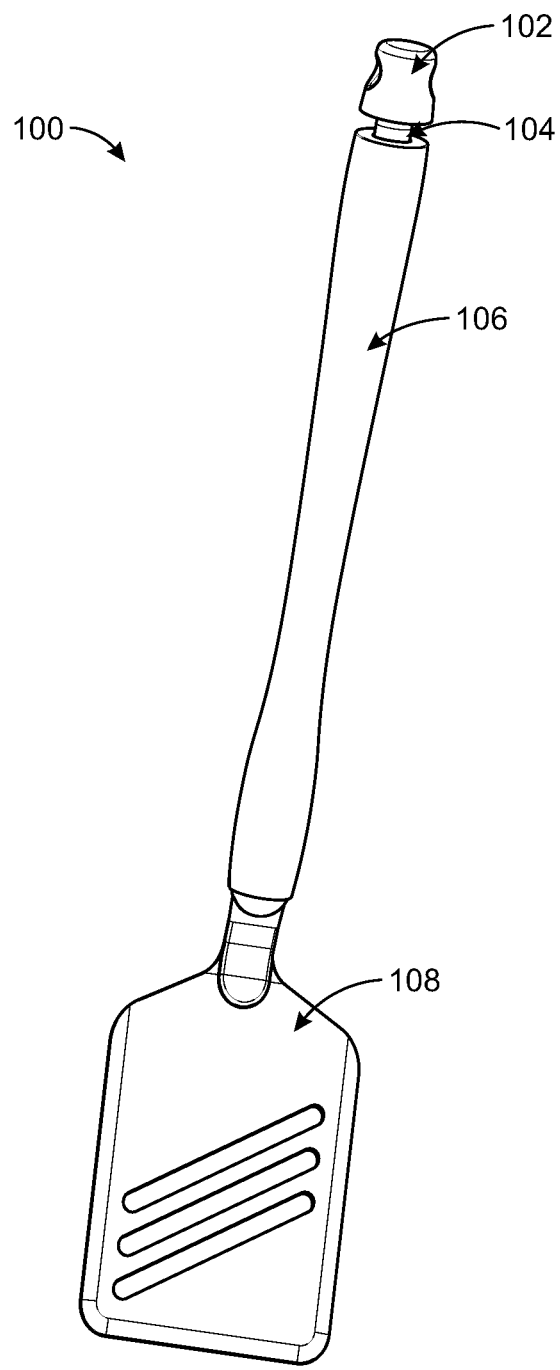
FIG. 1 depicts an example of an assembled kitchen instrument.

FIG. 1 shows an example assembled view of kitchen instrument 100. The kitchen instrument 100 comprises, in one or more non-limiting embodiments, an ejection knob 102, an ejection shaft 104, a handle 106, and a replaceable kitchen head 108. The ejection shaft 104 is shown inserted into the handle 106 and into the ejection knob 102 and is partially visible in FIG. 1 between the ejection knob 102 and the handle 106.

Figure 2A:
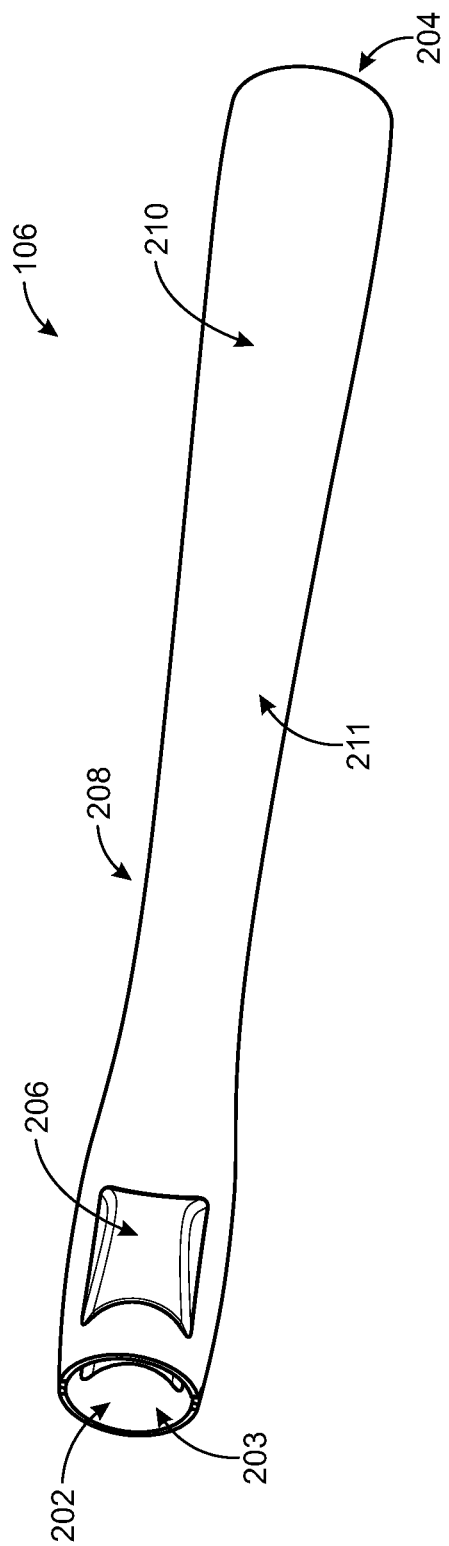
FIG. 2A depicts a bottom view of a handle of a kitchen instrument.
Figure 2B:
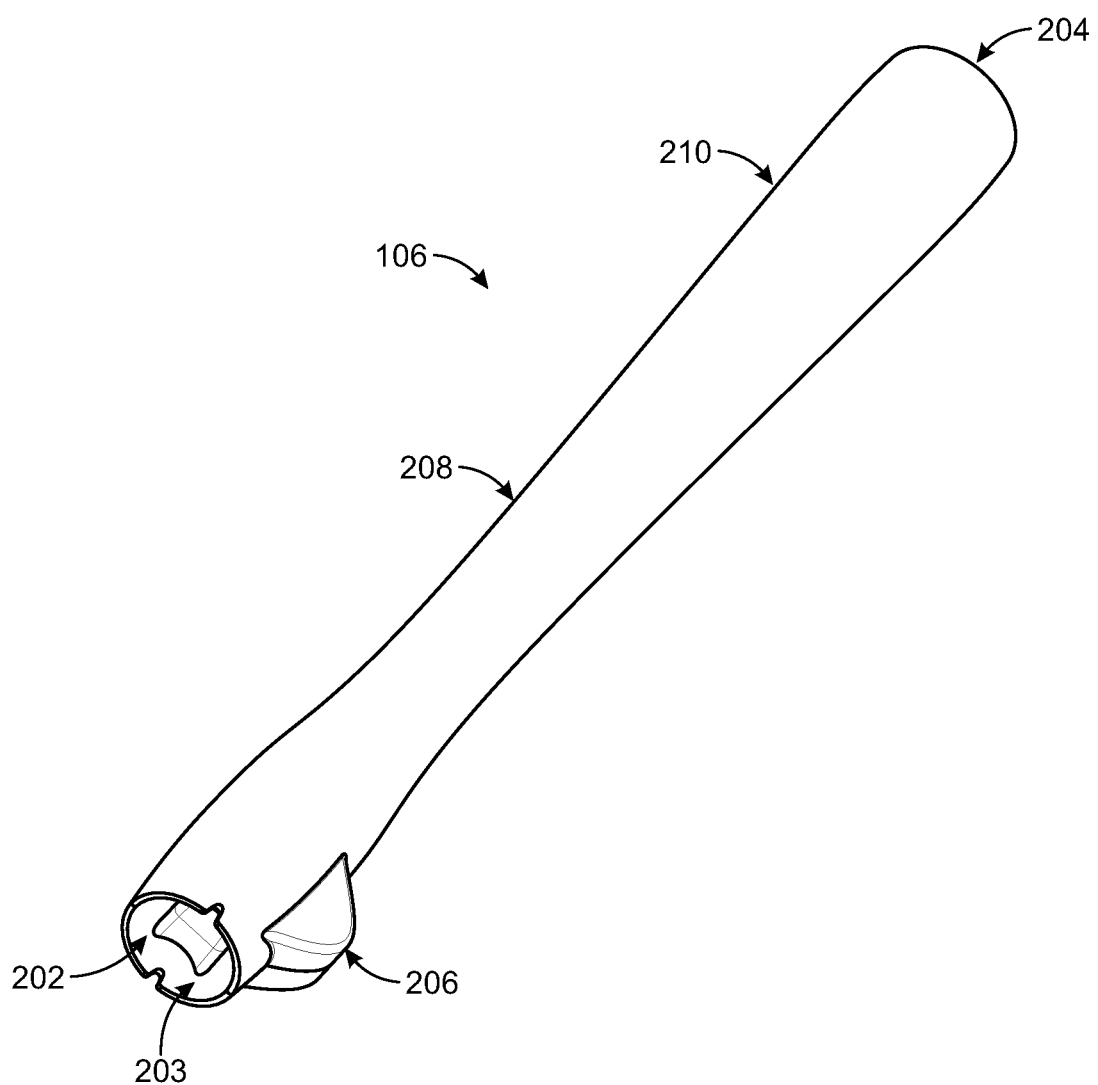
FIG. 2B depicts a side view of the handle of a kitchen instrument.
Figure 2C:
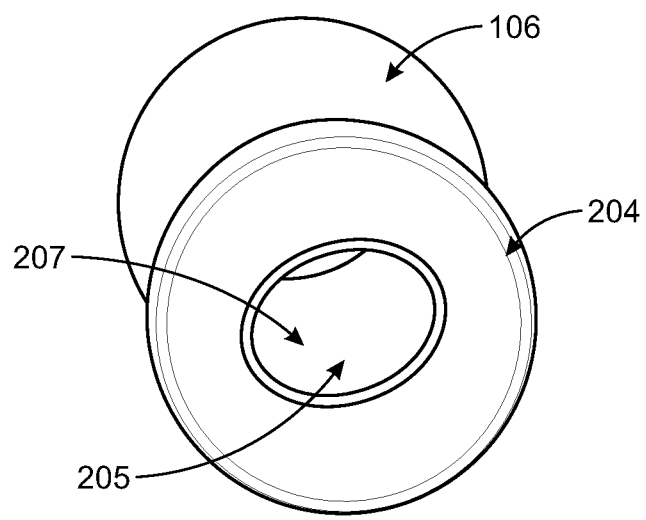
FIG. 2C depicts an interior view of a bottom end of the handle of the kitchen instrument.
Figure 2D:
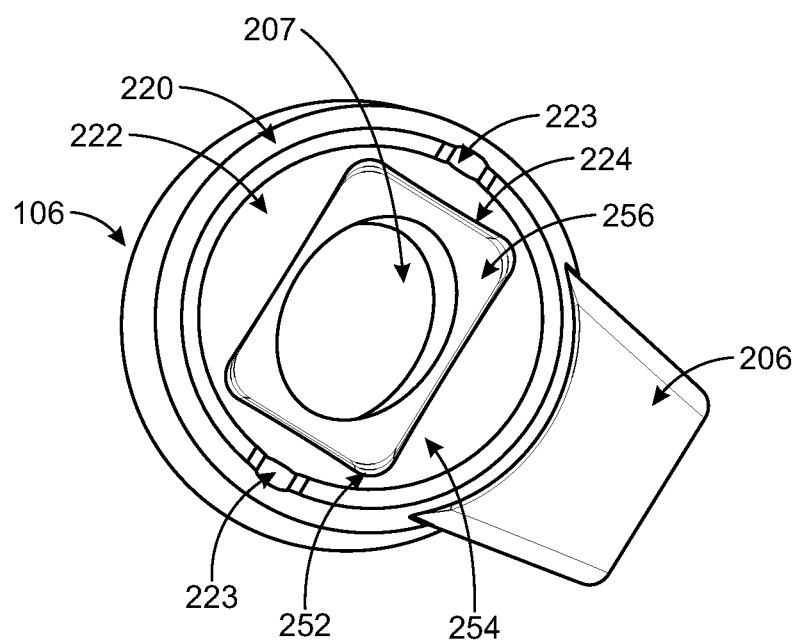
FIG. 2D depicts an interior view of a front end of the handle of the kitchen instrument.

FIGS. 2A-2D show various views of the handle 106 of the kitchen instrument 100 according to one or more non-limiting embodiments. FIG. 2A shows a side view, while FIG. 2B shows a front perspective view. FIG. 2C shows a back view and FIG. 2D shows a front side view of the kitchen handle 106 and its various exemplary components.

In a non-limiting embodiment, the handle shaft body 208 is an elongated member that may be cylindrically shaped and similar to a tube. In a non-limiting embodiment, there may be an outer gripping material 211 stretched out over the handle shaft body 208 to make the handle 106 easier to grip or hold and is comfortable to the hand. Such gripping material 211 may include silicone, plastics, leather, or another type of ergonomically shaped metal or plastics in one or more non-limiting embodiments. The gripping material 211 can be stretched over the handle 106 and remain in place by friction. Glues, staples, and other forms of connectors (not shown) may also be used to fix the gripping material 211 to the handle 106.

The handle shaft body 208 may be thicker in some portions and thinner in others. For example, a central portion of the handle shaft body 208 may be thinner in diameter and narrower than a diameter of the back portion 210 of the handle 106 in one or more non-limiting embodiments, as shown in FIG. 2A.

In a non-limiting embodiment, the kitchen instrument 100 may be manufactured using injection molding, although other manufacturing methods may alternatively be used. In one or more non-limiting embodiments, the handle 106 of the kitchen instrument may range from 6 inches long to 14 inches long.

As shown in FIG. 2A, there may be a rest 206 integrated or attached to an underside of the handle 106. The rest 206 may be shaped as shown in FIGS. 2A-2D in a generally triangular, ramp like shape. When a user places a handle 106 on a kitchen table surface or a pan or other surface, the rest 206 may raise the handle 106 above the underlying surface and prevent the replaceable kitchen head 108 from touching the underlying surface. Accordingly, the rest 206 usefully allows the handle 106 and attached replaceable kitchen head 108 when the kitchen instrument 100 is assembled to be raised at a slight angle slightly above the underlying surface.

The front 202 of the handle 106 is intended to be the area of the handle 106 that removably connects or couples to the replaceable kitchen head 108, as shown in FIG. 1. The back 204 of the handle 106 is intended to be the area of the handle 106 that allows the ejection shaft 104 to extend through the back opening 205 of the handle 106 in order to couple with the ejection knob 102 as shown in FIG. 1 and also shown in FIG. 6C.

Figure 3A:
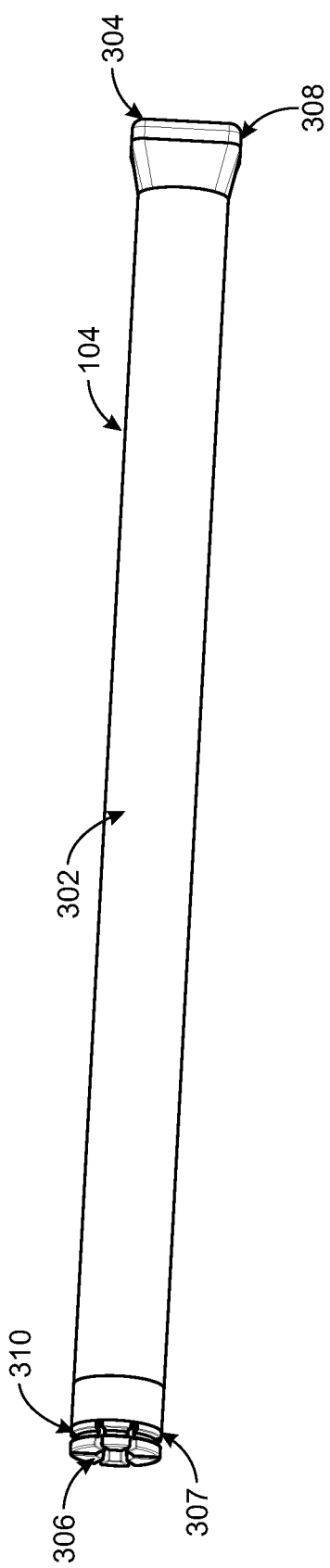
FIG. 3A depicts a side view of an ejection shaft for a kitchen instrument.
Figure 6A:
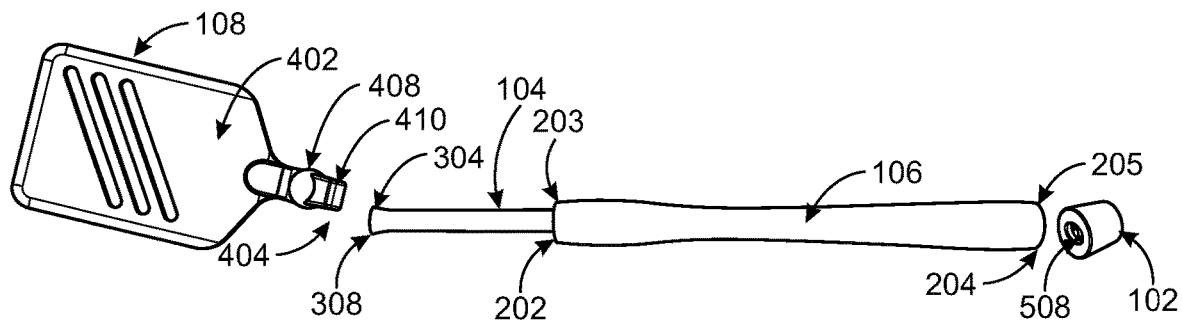
FIG. 6A depicts a partially disassembled view of the kitchen instrument shown in FIG. 1 with the replaceable kitchen head separate from the handle, and an ejection shaft inserted into the handle.
Figure 6B:
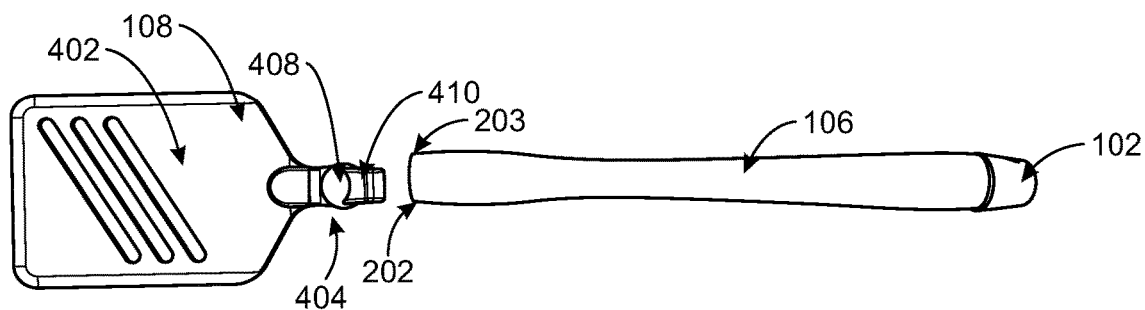
FIG. 6B depicts a partially dissembled view of an ejection shaft fully inserted into the handle of the kitchen instrument shown in FIG. 1.
Figure 6C:
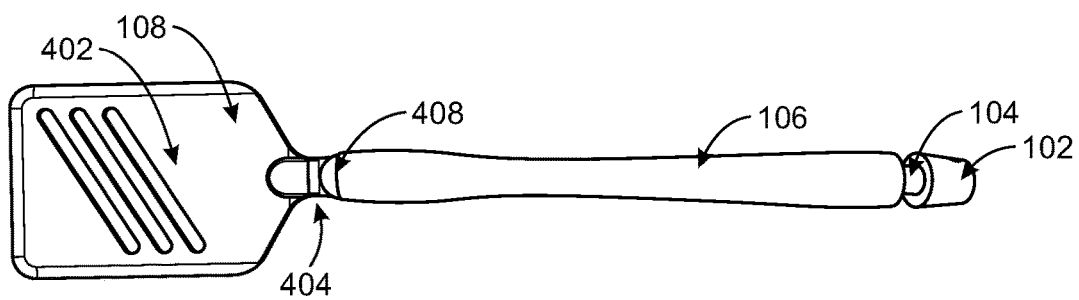
FIG. 6C depicts an assembled view with ejection shaft partially visible from the back of the handle and connected to the ejection knob.

FIG. 2C shows a back view of the handle 106 with a detailed view of a back side 204 of the handle 106. A shown in FIG. 2C, the interior of the handle 106 is hollow and has a cavity 207 extending through the handle 106 (and terminating at a back side of the second securing portion 224 as further explained with respect to FIG. 2D and FIG. 6D below). There is a back opening 205 in the back of the handle 106 that provides access to the interior cavity 207. In a non-limiting embodiment, a back end 306 of the ejection shaft 104, which is shown in FIG. 3A, is sized and shaped to be insertable from a front side 202 of the handle 106 out through the back opening 205 of the handle 106 (e.g., which is shown in FIG. 6A). Accordingly, in a non-limiting embodiment, the back side 306 of the ejection shaft 104 has a smaller diameter than the diameter of the hollow cavity 207 of the handle 106, so that the ejection shaft 104 can pass through the cavity 207 of the handle 106 smoothly and easily without too much friction. The ejection shaft 104 essentially slides through due to the user or other person pushing the ejection shaft 104 through hollow cavity 207 of the handle 106 from the front side 202 of the handle to the back side 204. Further, the back end 306 of the ejection shaft 104 is pushed out through the back opening 205 of the handle 106 in order to couple and connect with the ejection knob 102 (e.g., as shown in FIG. 6B and FIG. 6C).

Figure 6D:
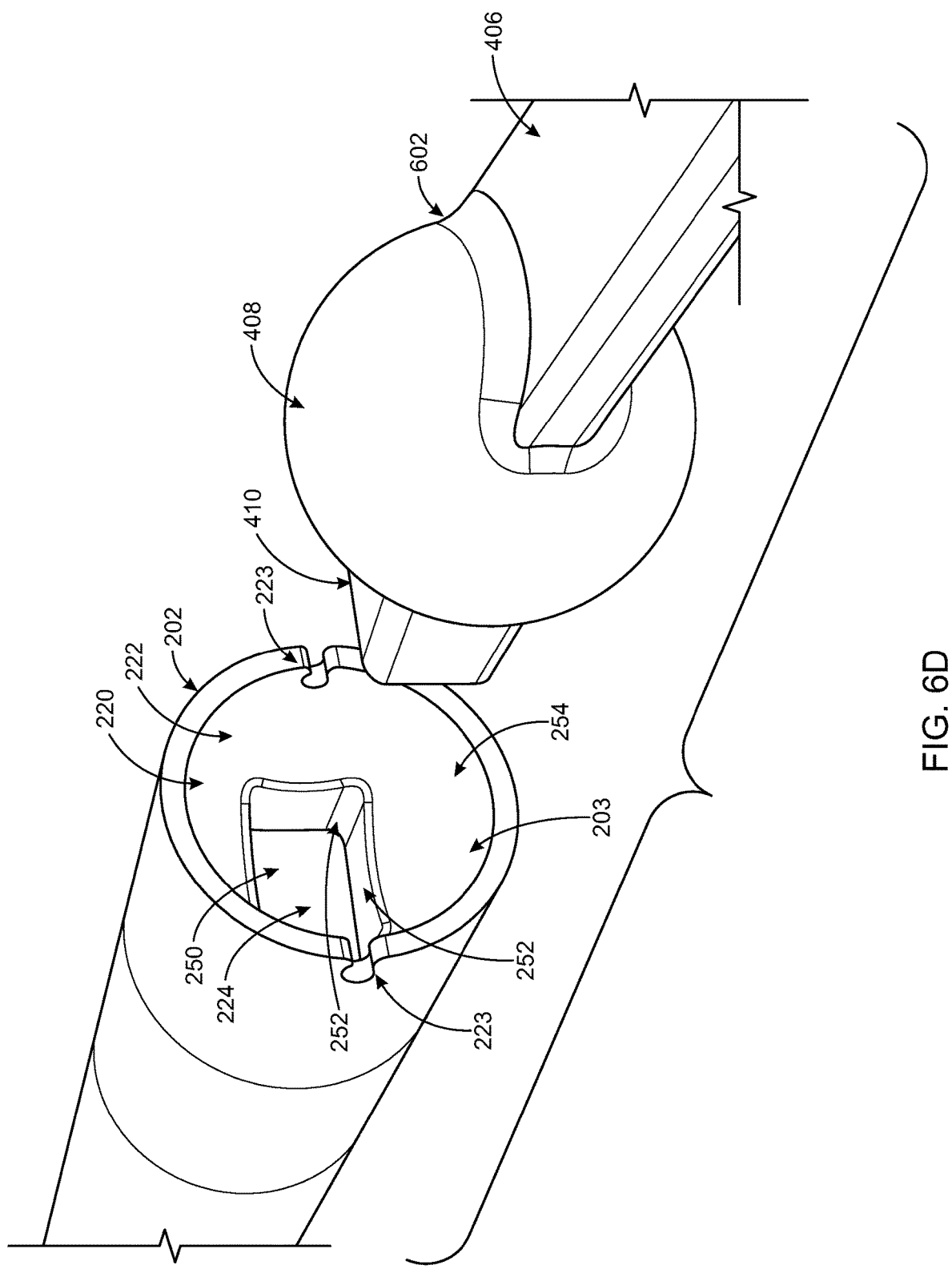
FIG. 6D depicts a disassembled view of the connector portion of a replaceable kitchen head oriented to be inserted into the indent portion of a handle.

With respect to the front side 202 of the handle 106, FIG. 2D shows a front view of the handle 106 and a close-up view of the front side 202 of the handle 106. In a non-limiting embodiment, the front side 202 of the handle 106 has an indent 220 that serves multiple purposes and has multiple elements to secure the replaceable kitchen head 108 in a manner that affixes the replaceable head 108 within the indent 220 and also prevents unwanted rattling of the replaceable kitchen head 108 and rotation within the indent 220. FIG. 6D also helps to portray the makeup of the indent 220 and the front side 202 of the handle 106 according to one or more non-limiting embodiments.

In a non-limiting embodiment, the front side 202 of the handle 106 includes an indent 220, which uniquely includes a first securing portion 222 and second securing portion 224 to secure the replaceable kitchen head 108 in such a way that the replaceable kitchen head 108 is locked in horizontally and also does not rotate within the indent 220. In a non-limiting embodiment, the first securing portion 222 has a curving surface 254 that curves or otherwise leads or progresses towards the hollow cavity 207 defined by a back end of the second securing portion 224. The second securing portion 224 is comprised of one or more sidewalls 252 that are recessed and begin at the front opening 203 opening that leads into the hollow cavity 207. In a non-limiting embodiment, one or more sidewalls 252 (e.g., the four sidewalls 252 creating a rectangular shape shown in FIG. 6D) leads inwardly and horizontally into the hollow cavity 207 of the handle 106 and towards the back end 204 of the handle and the back opening 205 of the handle 106. Accordingly, the handle 106 includes a hollow cavity 207 extended mostly through the body 208 of the handle 106, whereby the hollow cavity 207 begins where the second securing portion 224 of the indent 220 of the handle 106 begins.

In some embodiments, one or more slits 223 may be included in the sides of the indent 220 through the material of the first securing portion 220 which help prevent damage to the material of the first securing portion 220 of the handle 106 and may also be used to set the amount of force needed to insert and remove the connector 404 from the indent 220. The slits 223 may extend at least as far as the widest portion of the indent 220. The slits 223 help prevent damage to the first securing portion 220 by allowing space to open up rather than forcing the material to stretch for that distance. The slits 223 may be used to set the amount of force needed to insert and remove the connector 404 from the indent 220 because the length of the slit 223 will affect the flexibility of the material of the first securing portion 220. Thus, by adjusting the length of the slits 223, the force needed to insert or extract the connector 404 from the indent 220 may be adjusted.

Figure 4A:
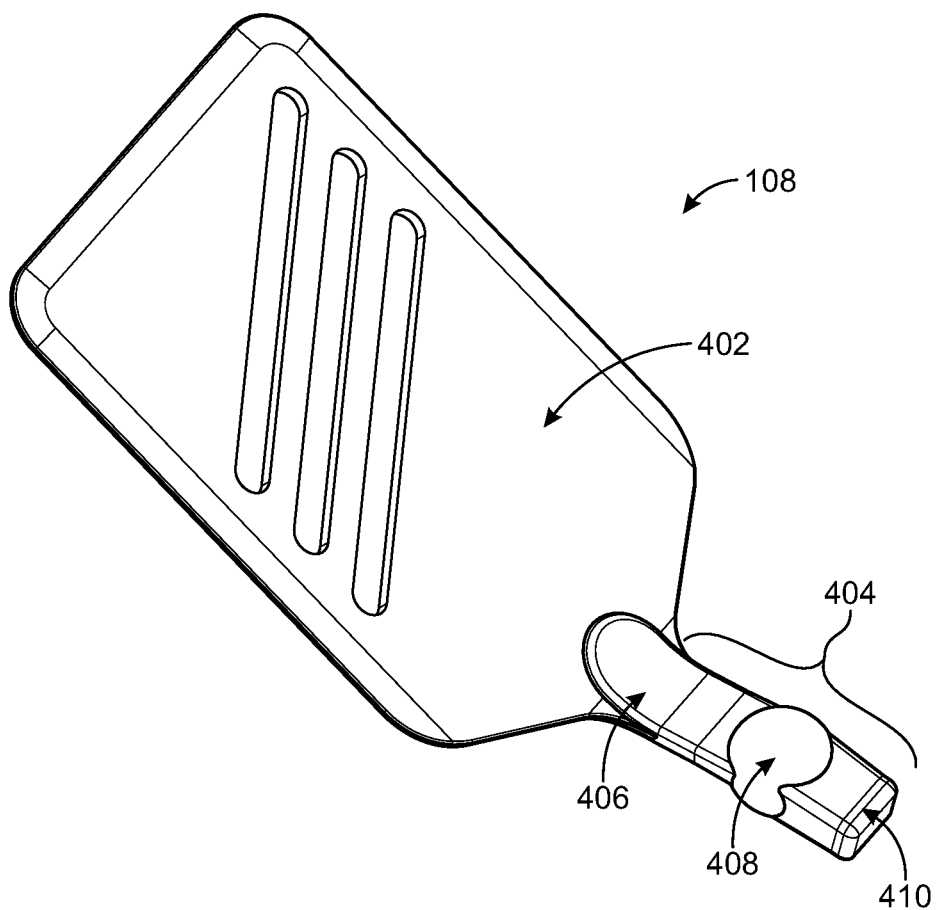
FIG. 4A depicts a front perspective view of an exemplary kitchen utensil head.
Figure 4B:
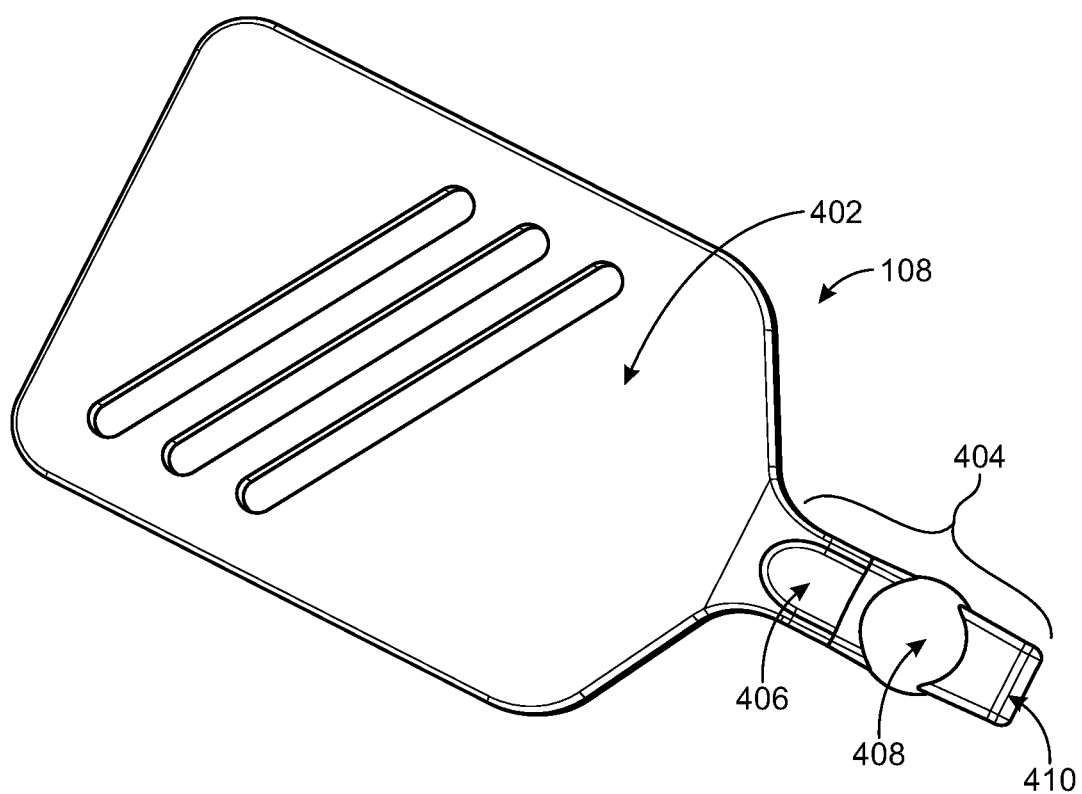
FIG. 4B depicts a front view of an exemplary kitchen utensil head.
Figure 4C:
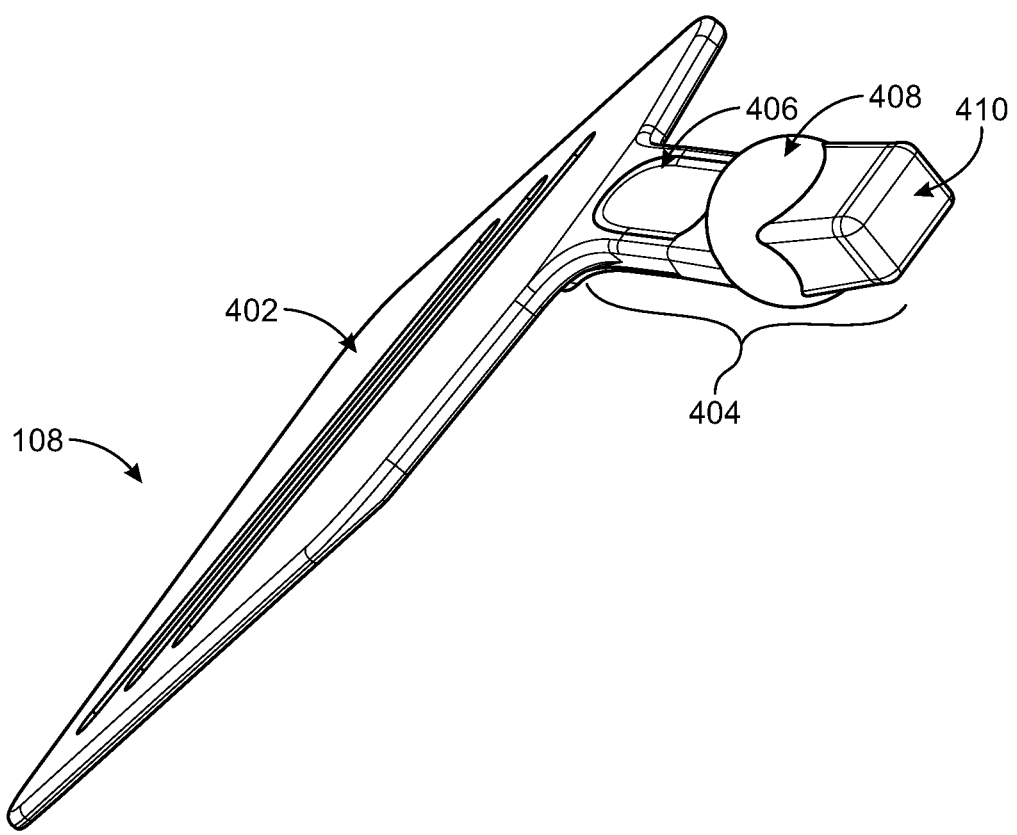
FIG. 4C depicts a bottom perspective view of the exemplary kitchen utensil head.

Turning to FIGS. 4A-4C, FIGS. 4A-4C depict one or more views of an exemplary replaceable kitchen head 108. In a non-limiting embodiment, the replaceable kitchen head 108 comprises a replaceable kitchen utensil head piece 402 and a connector 404. The replaceable kitchen utensil head piece 402 shown is an example of one type of kitchen utensil head piece 402 that may be part of a kit or set for the kitchen instrument 100. The example head piece 402 shown in FIGS. 4A-4C has the form of a spatula head, which is known for picking up food items. In other non-limiting embodiments, the replaceable kitchen utensil head piece 402 may take on the form and shape of many other types of kitchen utensils, including but not limited to, a fork head, a knife blade, a ladle head, spoon head, slotted spoon head, a whisk head, a potato masher head, a cheese slicer, a cheese grater, an ice cream scoop head, without limitation thereto. Any type of utensil head 402 may be attachable to handle 106 if necessary for use in a kitchen/cooking environment. Accordingly, the replaceable kitchen head 402 may serve one or more functions related to and is usable to either mix, pour, grab, grate, scoop, poke, slice, cut, hold, or mash a food related item.

The connector portion 404 of the replaceable kitchen head 108 is integrally formed with the replaceable kitchen head piece 402 according to one or more non-limiting embodiments. In a non-limiting embodiment, the connector portion 404 comprises a neck portion 406 that couples to or merges with a first connecting portion 408 (e.g., at 602 as shown in FIG. 6D), whereby the first connecting portion 408 is coupled to or merges with a second connecting portion 410. In a non-limiting embodiment, the first connecting portion 408 of the connector portion 404 of the replaceable kitchen head 108 is above or ahead of the second connecting portion 410. In a non-limiting embodiment, the first connecting portion 408 is configured to (sized and shaped) to fit in the first securing portion 222 of the indent 220 of the handle 106, while the second connecting portion 410 of the connector 404 of the replaceable kitchen head 108 is configured to (sized and shaped) to fit into the second securing portion 224 of the indent 220 of the handle 106. In a non-limiting embodiment, the first connecting portion 408 of the connector 404 is ball shaped, and the second securing portion 222 of the indent 220 has a curved surface to complement the curved ball shaped first connecting portion 408. Further, the rectangular shape created by the recessed sidewalls 252 of the second securing portion 224 of the indent 220 of the handle 106 complements the rectangular prism shape of the second connecting portion 410 of the connector 404 according to one or more non-limiting embodiments. Notably, the second connecting portion 410 may extend out of the second connecting portion 410 and have a shape with corners such as a polygon, a football shape, or may have any other shape that is not circular and cannot be rotated in a slot with the same shape. As shown in FIG. 4A, the second connecting portion 410 extends out from the center of the spherical shape of the first connecting portion 408. The second securing portion 224 may have a shape complementary to the shape of the second connecting portion 410 such that the second connecting portion 410 cannot rotate when in the second securing portion 224. The shape and orientation of the second securing portion 224 and the second connecting portion 410 may determine the relationship in orientation between the handle 106 and the replaceable kitchen head 108. Accordingly, the orientation of the second securing portion 224 of the handle 106 and the second connecting portion 410 may be important to the ergonomics of the kitchen instrument 100. Further, information about the connection between the connector 404 of the replaceable kitchen head 108 and the indent 220 of the handle 106 may be found with respect to FIGS. 6A-6D.

Figure 3B:
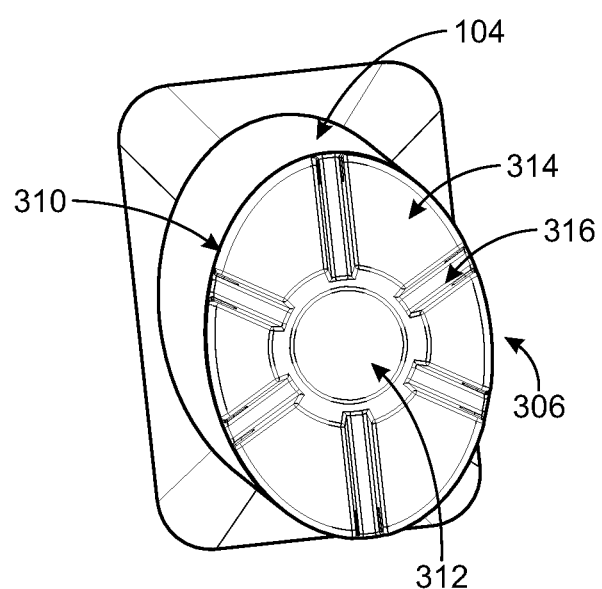
FIG. 3B depicts a top view of an ejection shaft for a kitchen instrument.
Figure 3C:
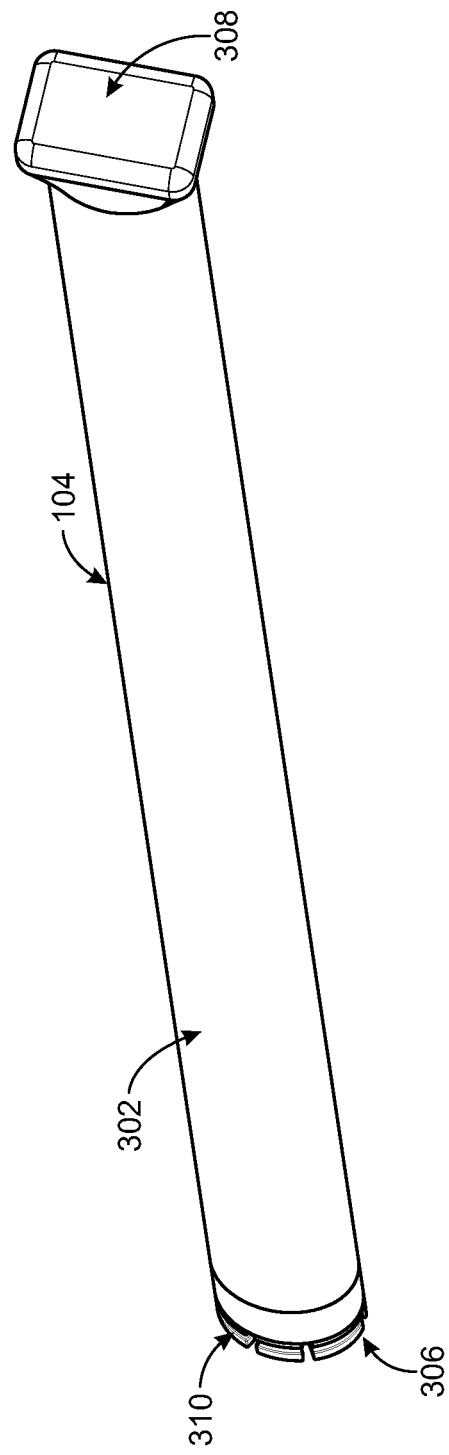
FIG. 3C depicts a bottom perspective view of an ejection shaft for a kitchen instrument.
Figure 5A:
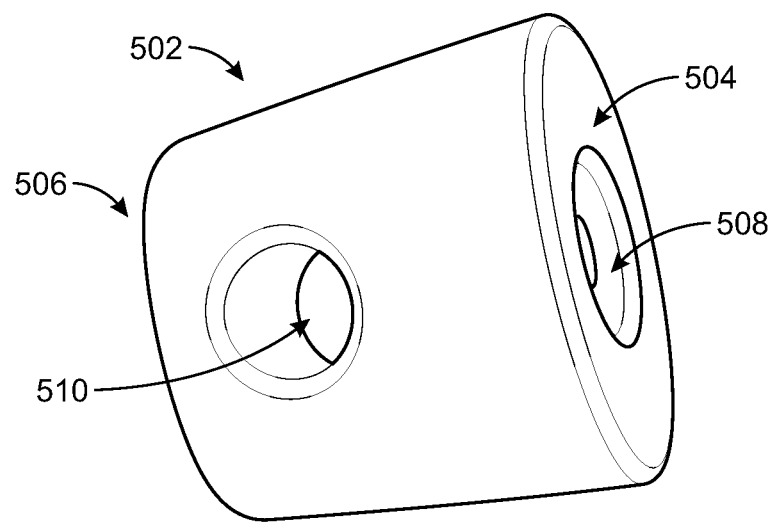
FIG. 5A depicts a side perspective view of a knob for a kitchen instrument.
Figure 5B:
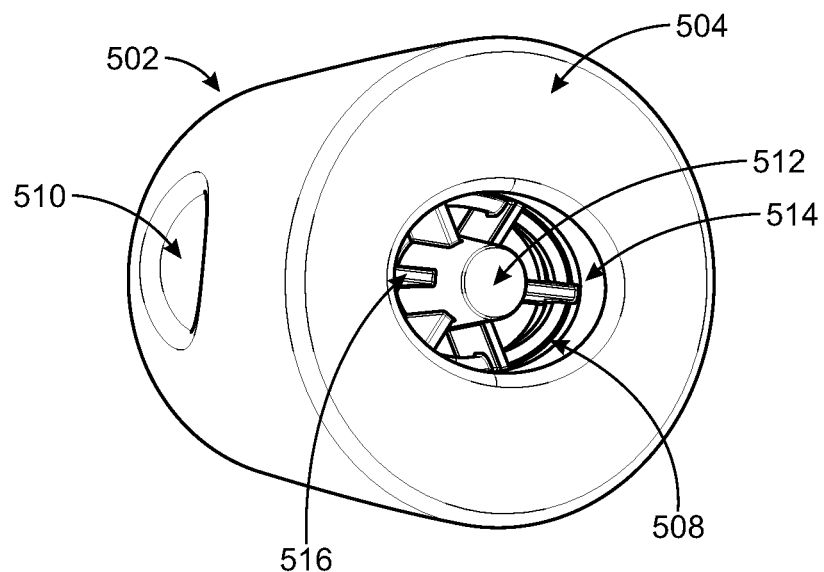
FIG. 5B depicts a front view of the knob for a kitchen instrument.

Turning to FIGS. 3A-3C, FIGS. 3A-3C show different views of the ejection shaft 104. FIGS. 5A-5B depict an illustrative embodiment of an ejection knob 102 according to one or more non-limiting embodiments. In a non-limiting embodiment, the ejection knob 102 and the ejection shaft 104 coordinate in a key role to cause the replaceable kitchen head 108 to be ejected from the handle 106 when the user 102 is ready to do so.

In a non-limiting embodiment, the ejection shaft 104 comprises a shaft body 302 having a front side 304 and a back side 306. The shaft body 302 is generally an elongated rod-shaped member. The diameter of the ejection shaft body 302 of the ejection shaft 104 is smaller and narrower than a diameter of the handle body 208 of the handle 106 in order for the ejection shaft 104 to smoothly and easily fit through the handle 106. In a non-limiting embodiment, the front side has a front member 308 that has a same cross-sectional shape as the shape of the second securing portion 224 of the indent 220 and as the hollow cavity 207 of the handle 106. In a non-limiting embodiment, the second securing portion 224 may be rectangular shaped as shown in FIGS. 3A-3C, but other suitable shapes include circular, oval, or any other shape as known in the art.

In a non-limiting embodiment, the back side 306 of the ejection shaft 104 includes one or more notches 310 to help connect to ejection knob 102. The back side 306 of the ejection shaft 104 may include a generally centrally located opening 312. In a non-limiting embodiment, the back member 306 of the ejection shaft 104 is configured and adapted to couple to the ejection knob 102. In a non-limiting embodiment, the shape and profile of the back member 306 of the ejection shaft 104 complements one or more shapes and profiles of a front face 504 of the ejection knob as shown in FIG. 5B.

In a non-limiting embodiment, as shown in FIG. 5B, the ejection knob 102 may have a back side 506 and a front side or front face 504 with the front side 504 having an interior cavity 508 and an interior protrusion 512. One or more recessed sidewalls 514 of the ejection knob leads to the interior protrusion 512. The interior protrusion 512 of the ejection knob 102 is intended to fit within the central opening 312 of the ejection shaft 104. In a non-limiting embodiment, the ejection shaft 104, as shown in FIG. 3B may have one or more grooves 316 configured or adapted to receive the one or more ribs 516 that radiate out from the central protrusion 512 of the ejection knob 102.

FIG. 5A further shows that the ejection knob 102, in one or more non-limiting embodiments, may have a side cavity 510 extending through the ejection knob 102. This may be useful for including a cord or tie for handing the kitchen instrument 100 when fully assembled. In other embodiments, the ejection knob 102 may not include a side cavity such as side cavity 510 shown in FIG. 5A.

FIGS. 6A-6D show various partial assembly views of how the ejection knob 102, ejection shaft 104, handle 106, and replaceable kitchen head 108 and their respective components may function and operate together to form an assembled kitchen instrument 100, and their various relationships and connections that can support replaceable kitchen head pieces 402 able to perform differing functions from each other while attached to the same handle 106, ejection shaft 104, and ejection knob 102 portion of the kitchen instrument 100.

In a non-limiting embodiment, to assemble a kitchen instrument 100, the ejection shaft 104 is inserted into a front side 202 of the handle 106, in a non-limiting embodiment. In other embodiments, the ejection shaft 104 may be inserted from the opposite side 204, namely, through a back side 204 of the handle 106, but in FIG. 6A, the ejection shaft 104 is inserted through the front side 202 and through the hollow cavity 207 of the handle 106. A front member 308 of the ejection shaft 104, when fully inserted in the hollow cavity 207 terminates at the back end of the second securing portion 224 of the indent 120. Further, the back member 307 of the ejection shaft 104 may extend outwardly beyond a back end 204 of the handle 106 through the central opening 205 of the back end 204 of the handle 106. In other words, when the connector 404 is completely inserted into the indent 220, the ejection shaft 104 may not be able to be fully inserted into the handle 106. Restated, the ejection shaft 104 should be sufficiently long that the ejection shaft 104 can eject the connector 404 from the indent 220 by being inserted into the handle 106 via the first opening 203 and into the hollow cavity 207 of the handle 106 such that the front end 308 of the ejection shaft 104 pushes onto the connector 404 of the replaceable kitchen head 108. When, the ejection knob 102 is depressed, the ejection shaft 104 can push or press the connector 404 of the replaceable kitchen head 108 out of the indent 220 sufficiently that the connector 404 of the replaceable kitchen head 108 is no longer secured in the indent 220 (i.e., the connector 404 is ejected).

As shown in FIG. 6B, when the ejection shaft 104 is fully inserted into the hollow cavity 207 of the handle 106, the back end 306 of the ejection shaft 104 can couple to the ejection knob 102. In a non-limiting embodiment, the protrusion 512 from the central opening 508 of the ejection knob 102 fits within the opening 312 of the back end 306 of the ejection shaft 104.

FIG. 6C shows that when the replaceable kitchen head 108 is inserted into the front side 202 of the handle 106 and into the indent 220, the ejection shaft 104 is pushed out through the back opening 205 further and pushes the ejection knob 102 away from the back 204 of the handle 106 such that the ejection knob 102 does not touch the back end 204 of the handle 106 when the ejection shaft 104 is inserted into the handle 106 and coupled to the ejection knob 102.

FIG. 6D shows a partial view of the connector 404 of the replaceable kitchen head 108 in the process of connecting to the indent 220 of the handle 106. In a non-limiting embodiment, the second connecting portion 410 of the connector 404 of the handle 106 is inserted first in order into the first securing member 224 of the handle 106, and then the first connecting portion 408 of the connector 404 fits within the second securing portion 222 of the indent 220 of the handle 106. As shown in FIG. 6C, when the connector 404 is fully connected to the handle 106, the second connecting portion 410 is fully contained within the second securing member 224, and the first connecting portion 408 is partially visible and partially contained within the first securing member 222 of the indent 220 of the handle 106.

Notably, the first connecting portion 408 of the replaceable kitchen head 108 complements the shape of the first securing portion 222 of the handle 106. Further, the second connecting portion 410 of the replaceable kitchen head 108 complements the shape of the second securing portion 224 of the handle 106. The first securing portion 222 may be arranged and shaped to secure the connector 404 in the indent 220 and the second securing portion 224 may be arranged and shaped to secure the connector 404 rotationally, i.e., prevent the connector 404 from rotating relative to the indent 220. The first connecting portion 408 may have a spherical shape or other round shape with the first securing portion 222 defining over half of a spherical or other complementary round shaped space as shown in FIG. 6C in one or more non-limiting embodiments. The elasticity of the material of the indent 220 of the handle 106 may allow the first connecting portion 408 to be pushed into the indent 220 even though (because the first securing portion 222 defines over half the spherical or round shape) the diameter of the opening of the indent 220 may be smaller than the diameter of the first connecting portion 408. When the first connecting portion 408 is inserted into the first securing portion 222, the first securing portion 222 may surround more than half of the first connecting portion 408 (i.e., go over and beyond the widest portion of the first connecting portion 408). In this way, friction and the elastic force of the material of the handle 106 may keep the first connecting portion 408 from exiting the indent 220 without a significant force (a force greater than that normally experienced when using the replaceable head for cooking, e.g., about 20 pounds for most uses) being applied to the replaceable head 108 away from the handle 106.

In some embodiments, the one or more slits 223 in the indent 220 included in the sides of the indent 220 through the material of the indent 220 help prevent damage to the material of the indent 220 of the handle 106 and may also be used to set the amount of force needed to insert and remove the connector 404 from the indent 220. The slits 223 may extend at least as far as the widest portion of the indent 220. The slits 223 help prevent damage to the indent 220 of the handle 106 by allowing space to open up rather than forcing the material to stretch for that distance. The slits 223 may be used to set the amount of force needed to insert and remove the connector 404 from the indent 220 because the length of the slits 223 will affect the flexibility of the material of the handle 106. Thus, by adjusting the length of the slits 223, the force needed to insert or extract the connector 404 from the indent 220 may be adjusted.

The ejection shaft 104 is intended to provide enough structural support to apply force to the connector 404 of the replaceable kitchen head 108 sufficient to eject the connector 404 from the indent 220 of the handle 106. The front end 308 of the ejection shaft 104 may have a different cross-sectional shape or size than the rest of the shaft 104. For example, the front end 308 may be wider than the ejection shaft 104 or have a cross sectional shape that matches the cross-sectional shape of the second securing portion 224 of the handle 106.

When the connector 404 is fully inserted into the indent 220, the connector 404 may have a snug fit with the indent 220 that does not allow for the replaceable kitchen head 108 to rattle (i.e., move relative to the handle 106) or allows for very little movement. In a non-limiting embodiment, the indent 220 may cover the entirety of the second connecting portion 224 and cover about 55%-65% of the first connecting portion 222. The amount of the first connecting portion 222 that is covered may be determined based on many factors including, the elasticity of the material of the indent 220, the friction coefficient between the indent 220 and the connector 404, the length of the slits 223, and the desired force to insert or eject the connector 404. Accordingly, in some embodiments, different amounts of the first connecting portion 408 may be inserted into the indent 220 and covered by the first securing portion 222. The ejecting shaft 104 may be held in place in the handle 106 by friction or, in some other embodiments, a latch or other type of securing mechanism at the back end 204 of the handle 106 and may be used to keep the ejecting shaft 104 from falling out of the handle 106.

Figure 7:
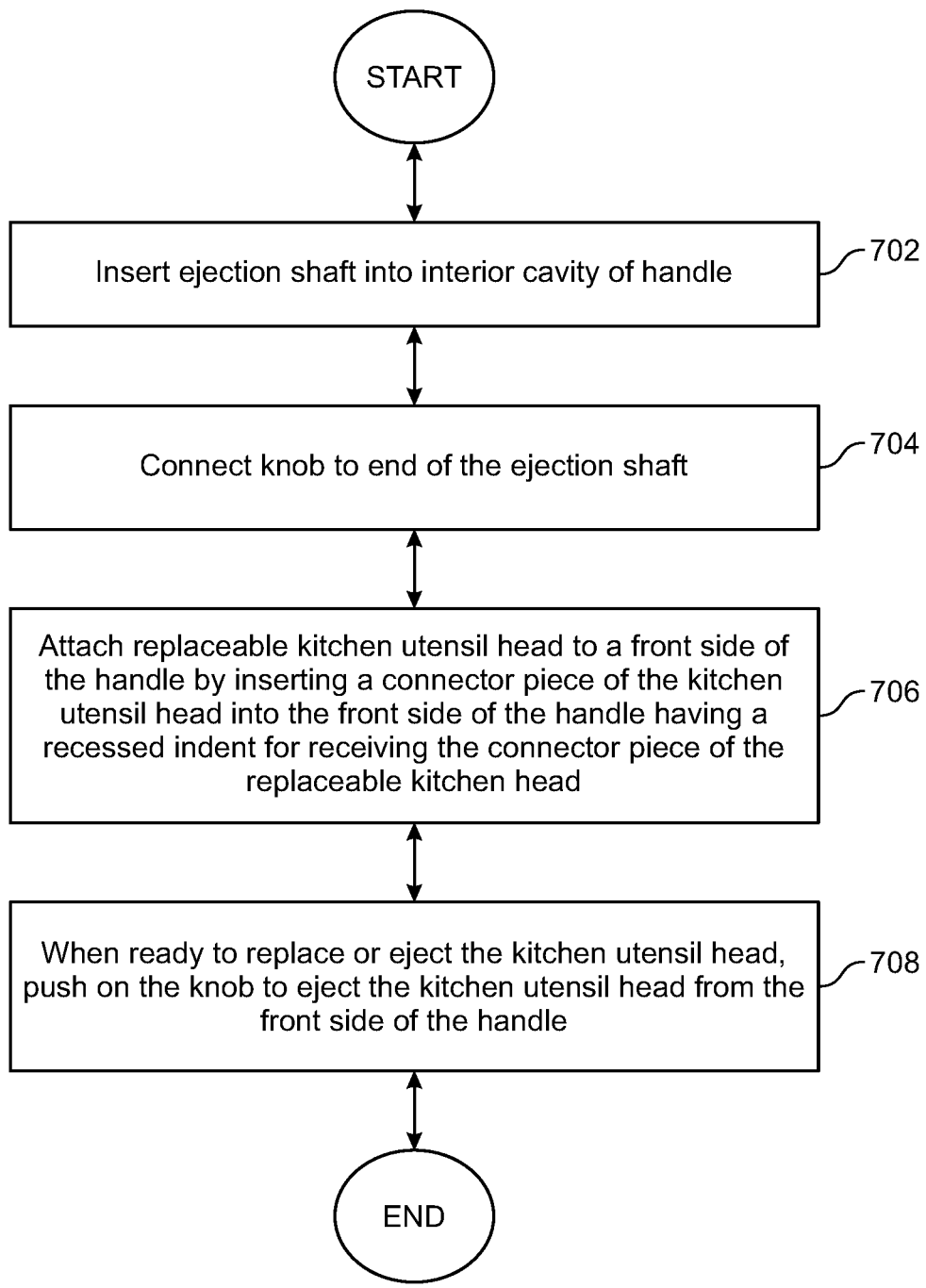
FIG. 7 depicts an exemplary flowchart for assembling and using a kitchen instrument.

FIG. 7 is a flowchart of an exemplary method of assembling the kitchen instrument 100 for use. In a non-limiting embodiment, at step 702, the method includes inserting an ejection shaft 104 into an interior cavity 207 of the handle 106. Next, as shown at step 704, the ejection knob 102 is connected to the back end 306 of the ejection shaft 104. The ejection shaft 104 may be protruding slightly out of the back end 204 of the handle 106. At step 706, the user may then attach a replaceable kitchen head 108 to an indent 220 on the front side of the handle 106 by inserting the connector 404 of the replaceable kitchen head 108 into the indent 220 configured to receive the connector piece 404 of the replaceable kitchen head 108. At step 708, when the user is ready to replace and/or eject the replaceable kitchen utensil head 108, the user pushes on the ejection knob 102 to eject the replaceable kitchen utensil head 108 from the front side 202 of the handle 106. Once the ejection knob 102 is depressed, the replaceable kitchen utensil head 108 quickly and easily falls out of the indent 220 and is no longer connected to the handle 106.

The kitchen instrument 100 has many uses and advantages. The kitchen instrument 100 allows for more efficient use of space in a kitchen because it reduces the space needed for several kitchen utensils by eliminating the need for every utensil to have its own handle (the handle generally being over 50% of the size of the kitchen utensil). Secondly, the utensil 108 reduces the amount of cleaning that needs to be done by using one handle 106 with several removable heads 402. Thus, only one handle 106 needs to be cleaned and any used kitchen head 402.

One of the advantages offered by the kitchen instrument 100 is the ease of use and secure fitting of the replaceable heads 108. The used (and often dirty) replaceable heads 108 may be easily ejected by pressing on the ejection knob 102. This can be done by hand or simply by pressing the ejection knob 102 against a countertop or other surface. Thus, the used replaceable head 108 can be ejected without touching the replaceable head 108, which may be hot or dirty from use. In some cases, the new replaceable head 108 can also be inserted by pressing the handle 106 against the replaceable head 108 without touching the replaceable head 108 with the user's hand. This makes replacing the replaceable head 108 very easy and convenient.

The kitchen instrument 100 also provides a very secure hold on the replaceable head 108 via the indent 220 and the first securing portion 222, and the second securing portion 224 that secure the replaceable head 108 and do not allow the replaceable head 108 to rotate or rattle in the indent 220.

Accordingly, the present description provides for various embodiments for a kitchen instrument 100. Many uses and advantages are offered by the kitchen instrument 100 as described above in one or more non-limiting embodiments in the present description.

In the Summary above, in this Detailed Description, the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most"

followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limits include both numbers. For example, "25 to 100" means a range whose lower limit is 25 and upper limit is 100 and includes both 25 and 100.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention, according to one or more embodiments described in the present description, may be practiced with modification and alteration within the spirit and scope of the appended claims. Thus, the description is to be regarded as illustrative instead of restrictive of the present invention.

What is claimed is:

1. A kitchen instrument comprising:
   an ejection knob with a front side having an interior cavity and an interior protrusion;
   an ejection shaft, comprising:
     a shaft body that is an elongated member;
     a front end of the shaft body; and
     a back end of the shaft body, wherein the back end of the shaft body comprises a back end shaft opening,
     wherein the ejection knob is configured to connect to the back end of the shaft body of the ejection shaft, wherein the interior protrusion fits within the back end shaft opening;
   a handle, comprising:
     a handle body having a first opening on a front side of the handle, wherein the first opening includes an indent having a first securing portion that curves or leads inwardly towards a second securing portion,
     wherein the second securing portion comprises one or more sidewalls that are recessed and lead into a hollow cavity of the handle, wherein the hollow cavity extends through the handle body from the second securing portion near the front side of the handle to a back side of the handle,
     wherein the ejection shaft is sized and shaped to be inserted within the hollow cavity of the handle and the interior cavity of the ejection knob;
   a replaceable kitchen utensil head comprising:
     a replaceable head utensil piece; and
     a connector connected to the replaceable head utensil piece, wherein the connector has a terminal end shaped and configured to interact with the indent to cause the connector to be secured within the first securing portion and the second securing portion of the indent and prevent rotation within the indent,
     wherein when the kitchen instrument is fully assembled, the ejection knob is configured to be depressed to cause the ejection shaft to push onto the connector to eject the replaceable kitchen utensil head from the handle of the kitchen instrument.

2. The kitchen instrument of claim 1, wherein the connector comprises a first connecting portion and a second connecting portion.

3. The kitchen instrument of claim 2, wherein a cross-sectional shape of the second connecting portion complements a shape of the second securing portion of the indent of the handle.

4. The kitchen instrument of claim 2, wherein the first connecting portion has the form of a ball-shaped member.

5. The kitchen instrument of claim 2, wherein the first connecting portion is positioned in between a neck on the connector that connects to the replaceable head utensil piece.

6. The kitchen instrument of claim 1, wherein the replaceable head utensil piece comprises a tool adapted to mix, stir, grab, hold, pour, scoop, mash, slice, poke, or cut another item including food related items.

7. The kitchen instrument of claim 1, wherein the back end of the ejection shaft is adapted to fit within the interior cavity of the ejection knob.

8. The kitchen instrument of claim 1, wherein the back end of the ejection shaft is sized to pass through an opening at the back end of the handle.

9. The kitchen instrument of claim 1, wherein a diameter of the back end of the ejection shaft is smaller than a diameter of the back end of the handle.

10. The kitchen instrument of claim 1, wherein the connector is fully contained by the indent when the replaceable kitchen utensil head is fully inserted into the indent.

11. The kitchen instrument of claim 1, wherein the indent further comprises slits located on a left and right side of the indent.

12. The kitchen instrument of claim 1, wherein a rest is located on an underside of the handle.

13. The kitchen instrument of claim 12, wherein the rest is configured to be used to place the kitchen instrument on a surface and raise the handle above a surface.

14. A method of assembling a kitchen instrument, comprising:
    providing an ejection knob with a front side having an interior cavity and an interior protrusion;
    providing an ejection shaft wherein the ejection shaft comprises a shaft body that is an elongated member, a front end of the shaft body, and a back end of the shaft body, wherein the back end of the shaft body comprises a back end shaft opening;
    providing a handle comprising a handle body having a first opening on a front end of the handle, wherein the first opening includes an indent having a first securing portion that curves or otherwise leads inwardly towards a second securing portion, wherein the second securing portion comprises one or more sidewalls that are recessed and lead into a hollow cavity of the handle, wherein the hollow cavity extends through the handle body from the second securing portion near the front end of the handle to a back end of the handle,
    wherein the ejection shaft is sized and shaped to be inserted within the hollow cavity of the handle and the interior cavity of the ejection knob;
    providing a replaceable kitchen utensil head comprising a replaceable head utensil piece having a connector connected to the replaceable head utensil piece, wherein the connector has a terminal end shaped and configured to interact with the indent to cause the connector to be secured within the first securing portion and the second securing portion of the indent and prevent rotation within the indent;

inserting the ejection shaft into the hollow cavity of the handle and the interior cavity of the ejection knob;

connecting the ejection knob to the back end of the shaft body, wherein the interior protrusion fits within the back end shaft opening; and after connecting the ejection knob to the back end of the shaft body, connecting the replaceable kitchen utensil head to the front end of the handle and to the indent, wherein the connector is secured within the first securing portion and the second securing portion of the indent of the handle.

15. The method of claim 14, wherein the terminal end of the connector of the replaceable kitchen utensil head comprises a first connecting portion configured to be secured within the first securing portion of the indent on the handle.

16. The method of claim 15, wherein the terminal end of the connector further comprises a second connecting portion configured to be secured within the second securing portion of the indent of the handle.

17. The method of claim 14, further comprising, upon connecting the replaceable kitchen utensil head to the front end of the handle, the ejection shaft pushes the ejection knob away from a back end of the handle such that the ejection knob does not touch the back end of the handle when the replaceable kitchen utensil head is connected to the front side of the handle.

18. The method of claim 17, wherein depressing the ejection knob causes the replaceable kitchen utensil head to be ejected and to detach from the front end of the handle.

19. The method of claim 18, wherein upon depressing the ejection knob, the ejection shaft pushes towards the connector of the replaceable kitchen utensil head and contacts a first connecting portion of the connector to eject the replaceable kitchen utensil head.

20. The method of claim 14, wherein the replaceable kitchen utensil head is usable to either mix, pour, grab, grate, scoop, poke, slice, cut, hold, or mash a food related item.

* * * * *